(12) United States Patent
Levert et al.

(10) Patent No.: US 6,682,015 B2
(45) Date of Patent: Jan. 27, 2004

(54) DEVICE FOR THE ATTACHMENT OF AN ENGINE TO AN AIRCRAFT

(75) Inventors: Stéphane Levert, Toulouse (FR); Sébastien Roszak, Toulouse (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/208,884

(22) Filed: Jul. 29, 2002

(65) Prior Publication Data

US 2003/0025033 A1 Feb. 6, 2003

(30) Foreign Application Priority Data

Jul. 31, 2001 (FR) .............................. 01 10291

(51) Int. Cl.⁷ .............................................. B64D 27/26
(52) U.S. Cl. ........................ 244/54; 60/39.31; 248/555
(58) Field of Search ................. 249/54, 53 R, 249/55; 60/39.31; 248/554, 555, 556, 557

(56) References Cited

U.S. PATENT DOCUMENTS

| | | | |
|---|---|---|---|
| 5,275,357 A | | 1/1994 | Seelen et al. .................. 244/54 |
| 5,277,382 A | * | 1/1994 | Seelen et al. |
| 5,620,154 A | | 4/1997 | Hey .............................. 244/54 |
| 5,649,417 A | * | 7/1997 | Hey |
| 5,927,644 A | | 7/1999 | Ellis et al. ..................... 244/54 |
| 6,189,830 B1 | * | 2/2001 | Schnelz et al. |
| 6,209,822 B1 | * | 4/2001 | Le Blaye |
| 6,330,995 B1 | * | 12/2001 | Mangeiga et al. |
| 6,347,765 B1 | * | 2/2002 | Jule et al. |
| 6,494,403 B2 | * | 12/2002 | Jule et al. |

FOREIGN PATENT DOCUMENTS

| | | | |
|---|---|---|---|
| EP | 0357504 | * 3/1990 | .................. 244/54 |
| FR | 2 698 068 | 5/1994 | .......... B64D/27/18 |
| WO | 93/11041 | 6/1993 | .......... B64D/27/26 |

* cited by examiner

Primary Examiner—Tien Dinh
(74) Attorney, Agent, or Firm—Thilen Reid & Priest LLP

(57) ABSTRACT

A device attaches an engine to an aircraft. The device (10) is inserted between the engine (14) and a pylon (12) designed to be attached to an aircraft structure, such as a wing or fuselage section. The attachment device (10) generally includes two brackets (18a, 18b) joined together and secured to the pylon (12) and two pairs of rods (20a, 20b, 22a, 22b) inserted between the two brackets (18a, 18b) and a part (24) of the structure of the engine (14). Thus the integrity of the link between the pylon (12) and the engine (14) is preserved in the event of failure of any of the parts which constitute the device, without there being any need for a backup attachment system.

5 Claims, 2 Drawing Sheets

DEVICE FOR THE ATTACHMENT OF AN ENGINE TO AN AIRCRAFT

TECHNICAL BACKGROUND

The invention concerns a device designed for attaching an aircraft engine to a pylon secured to a structural aircraft section such as the wing or fuselage.

More precisely, the invention concerns an attachment device designed to transmit to the aircraft structure, via the engine pylon, the loads acting on the engine in the lateral and vertical directions relative to the longitudinal axis of the engine, for the case where the engine is suspended under the wing. When the engine is mounted on the side of the fuselage, the attachment device concerned by the invention, is designed to transmit the loads applied in the lateral and vertical directions in relation to the longitudinal axis of the said engine.

In the remainder of the text, only the case of an engine suspended beneath an aircraft wing is described. The description below nevertheless applies also to the case of an engine mounted on the side of the fuselage, by replacing the loads acting in the vertical direction with loads acting in the horizontal direction.

STATE OF THE ART

The engines fitted to aircraft are suspended beneath the wing or mounted laterally on the fuselage via a device known as the "engine pylon". For simplification, this device is hereafter referred to as the "pylon".

The link between the engine and the pylon is generally provided by two or three complementary attachment devices, each performing distinct functions.

One of these attachment devices is intended to take up the engine torque as well as the loads generated by the engine in the lateral and vertical directions, in order to retransmit them to the aircraft structure via the pylon. The invention precisely concerns an attachment device of this type. It should be noted that such a device may be fitted indifferently at the front or rear of the engine, the dimensions of the constituent parts being adjusted in consequence.

As illustrated in particular by documents U.S. Pat. Nos. 5,620,154 and 5,275,357, certain of the existing attachment devices include a main attachment structure and a backup attachment structure. The main attachment structure transmits the loads in normal operation, i.e. when all the parts of the attachment device are intact. The standby attachment structure is intended to provide continuity of the load transmission function between the engine and the aircraft in the event of failure of one of the parts of the main attachment structure.

The existing attachment devices, such as those illustrated in the documents listed above, habitually include an intermediate bracket, attached to the engine pylon for example via bolts, and at least two spherical bearing equipped rods, which provide the link between the bracket and the engine. The articulated attachment of the rods to the bracket and to the engine prevents the structure from being subjected to loads along the longitudinal axis of the engine. This arrangement also compensates for the thermal expansion of the engine and preserves the isostatic nature of the link between the pylon and the engine.

As is also illustrated by documents U.S. Pat. Nos. 5,620,154 and 5,275,357, when the existing attachment devices include standby attachment devices, the latter generally include additional items, such as one or more additional rods inserted between the bracket and the engine. These additional items incorporate play such that they do not normally take up any load when the constituent parts of the main attachment structure are intact and, in consequence, are able to perform their functions.

Certain existing attachment devices, such as those used on "AIRBUS" aircraft, include an intermediate part inserted between the pylon and the bracket. This intermediate part has a trapezoidal section when viewed in cross-section in a plane passing through the longitudinal axis of the engine. It exhibits a first flat surface intended to be attached, for example via four bolts, to a flat inclined attachment surface on the pylon and a second flat horizontal surface for attachment of the bracket, for example via four other bolts. The intermediate part may be in one piece or made up of two half-parts assembled together by bolts.

In the existing attachment devices, such as those described in documents U.S. Pat. Nos. 5,620,154 and 5,275,357, the additional parts which constitute the backup attachment structure are invariably inserted between the main attachment structure bracket and the engine. In other words, these additional parts preserve the integrity of the engine attachment when the link between the bracket and the engine is jeopardised. However, they are not able to preserve this integrity if the failure concerns the link between the pylon and the bracket, i.e. for example the attachment bolts connecting these two items or the intermediate part, if the latter exists.

Moreover, the combination of main and standby attachment functions through separate additional items leads to attachment devices which are both heavier and more complex. This goes against the permanent objectives in the aeronautical field, which are weight saving, simplification and reliability.

Additionally, when the loads to be transmitted are very large, in particular in the case of heavy high-thrust engines, it may be found necessary to reinforce the attachment device. This then leads to an increase in the number of attachment points. Thus, the attachment of the bracket to the intermediate part, when it exists, or directly to the pylon must be provided by two rows of four bolts instead of two rows of two bolts as used habitually. This means that the bracket attached to the pylon must be made stiffer, which is achieved by increasing its dimensions. Thus, the width of the bracket may, for example, be virtually doubled relative to that of a conventional bracket.

With such an arrangement, it is easy to see that the loading of the four bolts is not uniform. Indeed, the two bolts located outboard transmit little load relative to the two bolts located inboard. In fact, about 20% of the loads are applied to the outer bolts and 80% of the loads are applied to the inner bolts. With time, this proportion generates much greater structural fatigue of the inner bolts than of the outer bolts. This leads to a much higher probability of failure for the inner bolts.

This problem could be resolved by reinforcing the inner bolts. However this would involve resorting to a specific tool for tightening these bolts. Additionally, such bolts would protrude into the airflow and generate drag. Also, in view of the limited space available in the attachment device, this solution is difficult to apply in practice.

PRESENTATION OF THE INVENTION

The invention precisely covers a device for attachment of an engine to a pylon on an aircraft, whose original design preserves the integrity of the attachment of the engine even in the event of failure of one of the parts of the main attachment structure or of the intermediate part, if one exists, whilst at the same time providing homogeneous distribution and transmission of the engine loads to the pylon.

In accordance with the invention, this result is obtained by using an engine to aircraft pylon attachment device, consisting of two assemblies forming lateral rods, and means of linking able to separately connect each of the assemblies forming lateral rods to each of the items constituted by the pylon and the engine, characterized in that each of the linking means includes a pin passing through the said rods and the central web of a female yoke without play, and passing through the side webs of the said female yoke with play.

According to a preferred production method for the invention, the attachment device additionally includes an assembly forming a bracket, and means of attachment by which the assembly forming a bracket is able to be attached to the pylon, and in which the assembly forming a bracket includes at least two brackets and each assembly forming a lateral rod includes two rods able to separately connect each of the brackets to the engine.

The presence of an assembly forming a bracket and the duplication of the bracket and rods to take up the loads between the engine and the brackets, therefore enable the deletion of a standby structure such as described in documents U.S. Pat. Nos. 5,620,154 and 5,275,357. Indeed the attachment device in accordance with the invention is capable of taking up the loads in the various possible failure cases, without the need for any additional parts.

Additionally, whereas the attachment devices described in the two above-mentioned documents do not preserve the integrity of the engine attachment in the event of a failure of the link between the pylon and the bracket, the attachment device in accordance with the invention also covers this type of failure.

In other words, the attachment device in accordance with the invention is able to preserve the total integrity of the link between the pylon and the engine, whilst remaining simple and reliable.

According to another preferred production method, although not restrictive, of the invention, the attachment device additionally includes an assembly forming an intermediate part, inserted between the two brackets and the pylon. This assembly forming an intermediate part consists of two intermediate parts and the means of attachment include the first means of attachment of each bracket to one of the intermediate parts and second means of attachment of each intermediate part to the pylon.

Moreover, it should be noted that the duplication of the rods taking up the loads and their attachment to the bracket with bolts provide enhanced distribution and reliable transmission of the loads in the said bolts, the load applied to each bolt being equal to the same fraction of the total load to be transmitted.

The means of linking each assembly forming a lateral rod to the brackets preferably include two female yokes belonging to each of the brackets, and whose overlapping webs form the said central web.

Additionally, spherical bearings are advantageously inserted between the pin on the one hand and the rods and the central web of the female yokes on the other hand. This arrangement permits to give greater mobility to the pin. In some extreme conditions, the pin can contact the edge of the bore provided within the lateral webs of the female yoke.

Then, the loads can be transmitted via one or the other of the lateral webs of the female yoke. As the loads are extreme, it is thus easier to distribute it in such conditions. The gap between the pin and the bores provided in the lateral webs must be sufficient to prevent the pin from any contact with the edge of the bores under normal load conditions, in order to avoid unnecessary fatigue of the lateral webs.

Then, the device acts simultaneously as a main attachment structure and an emergency attachment structure and, in the event of extreme loads, it provides an additional path for transmitting the loads from the engine to the pylon.

BRIEF DESCRIPTION OF THE DRAWINGS

A description is provided below, as an illustrative but non limiting example, of a preferred production method for the invention, referring to the diagrams provided in the appendix, in which.

DETAILED DESCRIPTION OF A PREFERRED PRODUCTION METHOD FOR THE INVENTION

Figure 1:
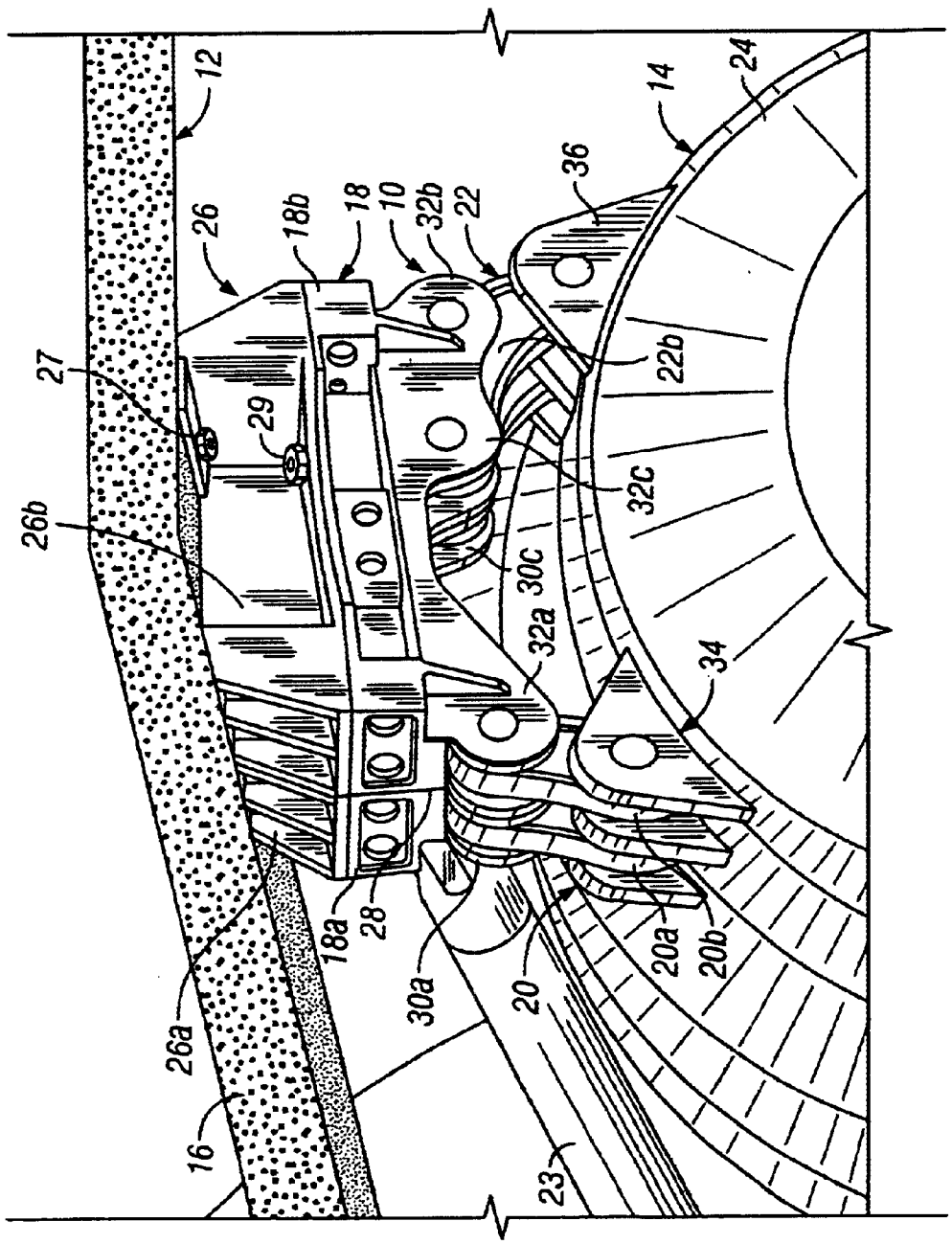
FIG. 1 is a three-quarter rear view, in perspective, representing a device for attaching an aircraft engine to a pylon, in accordance with the invention.

As illustrated schematically in FIG. 1, an attachment device (10) in accordance with the invention is inserted between an engine pylon (12) and an aircraft engine (14), at the front or at the rear of the said engine.

The engine pylon (12) is designed to be attached to an item of the aircraft structure, such as a section of the wing or fuselage. This attachment is provided by conventional means, which are not part of the invention. To facilitate understanding of FIG. 1, the top part of the engine pylon (12) including the means of attachment of the latter to the aircraft structure, has intentionally been omitted. More precisely, FIG. 1 simply shows the lower spar (16) of the pylon (12).

The attachment device (10) acts as an interface between the aircraft engine (14) and the engine pylon (12). More precisely, in the production method represented as an example in the figures, the function of the attachment device (10) is to take up the loads exerted in the lateral and vertical directions (in the case of an engine suspended from a wing) in relation to the longitudinal axis of the engine (14), to retransmit them to the aircraft structure via the pylon (12). Another function of the attachment device (10) is to transfer the loads, even in the event of failure of any part included in the device.

Other attachment devices (not represented) are inserted conventionally between the pylon (12) and the engine (14) to transmit to the latter the loads exerted in other directions. These other devices are produced in accordance with various techniques which are familiar in the trade. They are not part of this invention.

The attachment device (10) in accordance with the invention includes a single attachment structure, which transmits all the above-mentioned loads, irrespective of whether or not its constituent parts are damaged. The attachment device (10) thus combines the main attachment and backup attachment functions.

In the preferred production method for the invention illustrated in FIG. 1, the attachment device (10) includes an assembly (18) forming a bracket, which includes two brackets (18*a*) and (18*b*), as well as two assemblies (20) and (22) forming lateral rods, each including two rods (20*a*), (20*b*) and (22*a*), (22*b*) respectively (rod (22*a*) is not visible in the figures). Each of the lateral rods (20*a*), (20*b*), (22*a*) and (22*b*) is articulated separately from the assembly (18) forming a bracket and to a part (24) of the structure of the engine (14), intended for attachment to the pylon, in order to provide the link between the engine (14) and the assembly (18) forming a bracket in opposite circumferential directions relative to the engine.

The attachment device (10) in accordance with the invention also includes two spherical bearing equipped rods (23) connecting the assembly (18) forming a bracket to the engine (14) in oblique directions relative to the engine longitudinal axis.

In the production method represented in the figures, the attachment device (10) additionally includes an assembly (26) forming an intermediate part, which includes two intermediate parts (26*a*) and (26*b*), through which the assembly (18) forming a bracket is attached to the engine pylon (12). In an alternative configuration, the assembly (26) forming the intermediate part may however be deleted whilst still remaining within the context of the invention.

Finally, means of attachment are provided for attachment of the assembly (18) forming a bracket to the pylon (2). In the production method represented in the figures, these attachment means include first means of attachment, such as bolts (not represented), for attachment of the brackets (18*a*) and (18*b*) to the intermediate parts (26*a*) and (26*b*), and second means of attachment, such as bolts (not represented), for attachment of the intermediate parts (26*a*) and (26*b*) to the lower spar (16) of the pylon (12).

Brackets (18*a*) and (18*b*) are assembled one to another along an interface (28) which represents the plane of symmetry of the assembly forming a bracket (18). The assembly of brackets (18*a*) and (18*b*) is achieved using suitable assembly means such as bolts (not represented).

Each of the brackets (18*a*) and (18*b*) includes three female yokes (30*a*), (30*b*), (30*c*) and (32*a*), (32*b*), (32*c*), respectively, whose webs are incorporated within the corresponding bracket (the female yoke (30*b*) is not visible in FIG. 1).

The part (24) of the structure of the engine (14), intended for attachment to the pylon (12), includes two yokes (34) and (36). The female yokes (34) and (36) may be incorporated within the structure of the engine (14) or be attached to it using the techniques familiar in the trade, and which are not part of the invention.

Figure 2:
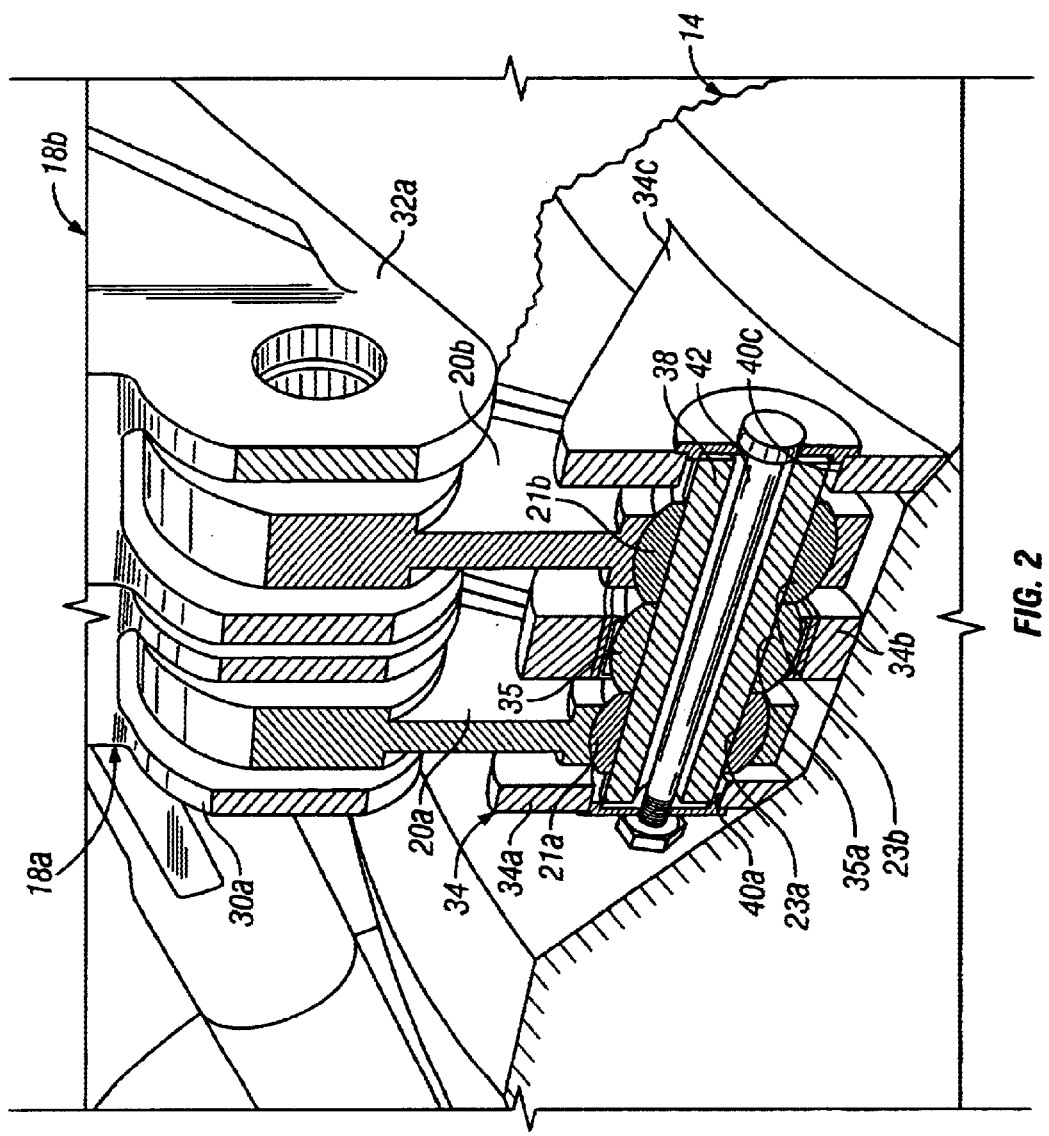
FIG. 2 is a side view on a larger scale, in perspective and cut-away, of the device shown in FIG. 1.

As shown more precisely in FIG. 2 in the case of yoke (34), each of the female yokes (34) and (36) includes two side webs (34*a*), (34*c*) and (36*a*), (36*c*), as well as a central web (34*b*) and (36*b*) respectively (webs (36*a*), (36*b*) and (36*c*) are not shown in FIG. 2).

Rods (20*a*) and (20*b*)in the first assembly (20) forming lateral rods, are straight. These rods (20*a*) and (20*b*) are respectively inserted between the female yokes (30*a*) and (32*a*) of brackets (18*a*) and (18*b*) and the female yoke (34) attached to the part (24) of the engine structure.

Rods (22*a*) and (22*b*) of the second assembly (22) forming lateral rods, are Vee-shaped, and are known as "boomerang". These rods (22*a*) and (22*b*) are respectively inserted between the female yokes (30*b*), (30*c*) and (32*b*), (32*c*) of brackets (18*a*) and (18*b*) and the female yoke (36) attached to the part (24) of the structure of the engine.

A description follows, referring to FIG. 2, of the means of attachment of the rods (20*a*) and (20*b*) to the female yoke (34). The means of attachment of the rods (22*a*) and (22*b*) to the female yoke (36) are identical to the above and are therefore not described here. The same applies to the means of attachment of rods (20*a*) and (20*b*) to the female yokes (30*a*) and (32*a*) on brackets (18*a*) and (18*b*) and to the means of attachment of rods (22*a*) and (22*b*) to the female yokes (30*b*), (30*c*) and (32*b*), (32*c*) on brackets (18*a*) and (18*b*).

The above-mentioned attachment means include spherical bearings (21*a*) and (21*b*) fitted within the ends of each of the rods (20*a*) and (20*b*), a spherical bearing (35) fitted in the central web (34*b*) of the female yoke (34) and a hollow pin (38). More precisely, the hollow pin (38) passes through bores (40*a*) and (40*c*) machined respectively in the lateral webs (34*a*) and (34*c*) of the female yoke (34), bores (23*a*) and (23*b*) machined respectively in the spherical bearings (21*a*) and (21*b*) and a bore (35*a*) machined in the spherical bearing (35). A bolt (42) passes through the hollow pin (38) from end to end, in order to assemble the rods (20*a*) and (20*b*) to the yoke (34).

The diameter of the bores (40*a*) and (40*c*) machined in the lateral webs (34*a*) and (34*c*) of the female yoke (34) is slightly larger than the external diameter of the pin (38). Thus, in normal operation, there is a clearance between the pin (38) and the lateral webs (34*a*) and (34*c*) sufficient to ensure the parts do not touch one another. This clearance takes into account expansion and the displacements of the engine relative to the various items.

Conversely, the diameter of the bore (35*a*) machined in the spherical bearing fitted in the central web (34*b*) of the yoke (34) is equal to that of the pin (38) which ensures that these parts are in permanent contact.

The clearance between the pin (38) and the lateral webs (34*a*) and (34*c*) ensures that the engine loads can still be transmitted to the pylon even in the event of failure of one of the two rods (20*a*) and (20*b*) or of the central web (34*b*). Additionally, at the other end of the rods (21*a*) and (21*b*), the lack of clearance between the corresponding hollow pin and the spherical bearing fitted in the central webs of yokes (30*a*) and (32*a*) of the brackets (18*a*) and (18*b*) effectively joins and stiffens the said central webs, which then act, from a functional point of view, as two one-piece central webs.

The same advantage is to be found at the link provided by rods (22*a*) and (22*b*).

When they exist, the intermediate parts (26*a*) and (26*b*) provide an interface between the brackets (18*a*) and (18*b*) and the lower spar (16) of the pylon (12). In the most common case, where the engine is suspended beneath the wing of the aircraft, its attachment is achieved via a flat surface on the lower spar (16) facing downwards and forwards. The interface parts (26*a*) and (26*b*) take into account this inclination and provide the horizontal orientation of the top flat surface of the assembly (18) forming a bracket. To that effect, the assembly (26) forming the intermediate part exhibits a trapezoidal section when viewed in cross-section in a plane passing through the longitudinal axis of the engine (14).

The intermediate parts (26*a*) and (26*b*) are assembled one to the other along the interface (28), which also represents the plane of symmetry of the assembly (26) forming the intermediate part. The assembly of the intermediate parts (26*a*) and (26*b*) is provided by suitable assembly means such as bolts (not represented).

Thus, the assembly (26) forming the intermediate part exhibits a flat top surface, intended for attachment by suitable attachment means to the lower inclined face of the lower spar (16) of the pylon (12). The assembly (26) forming the intermediate part also exhibits a flat bottom surface, which is attached by suitable attachment means to the flat top surface of the assembly (18) forming a bracket.

More precisely, each of the intermediate parts (26a) and (26b) is attached beneath the lower spar (16), by means of two bolts (27) or by any other technically equivalent means. Similarly, each of the intermediate parts (26a) and (26b) is attached to one of the brackets (18a) and (18b) for example by two bolts (29) or by any other technically equivalent means.

In the event of failure of any of the four rods (20a), (20b), (22a) or (22b), the loads exerted by the engine (14) are transmitted to the pylon (12) via the other rod of the assembly forming a rod (20) or (22) of which one rod has failed, as well as by all the other intact parts of the attachment device (10). In other words, the duplication of parts ensures transmission of the loads irrespective of the part of the device which fails.

Consequently, the attachment device in accordance with the invention achieves the intended objectives, which consist in preserving the integrity of the engine attachment even in the event of failure of any of the parts of the said device, in ensuring a better and more reliable distribution of the transmission of loads and in simplifying the said attachment device.

Obviously, the invention is not restricted to the production method which has just been described which is merely an example. In particular, the attachment between the rods (20a), (20b), (22a) and (22b) and the pylon (12) and between the rods (20a), (20b), (22a) and (22b) and the structure of the engine (14) may be different from those described. Thus, as already mentioned, the intermediate parts (26a) and (26b) may, in certain cases be deleted. Similarly, the bolts which provide the attachment between the pylon (12) and the intermediate parts (26a) and (26b) as well as between these and brackets (18a) and (18b) may be replaced by equivalent attachment means such as bolts, or other. Finally, the brackets (18a) and (18b) may also be deleted. In such case, the rods are articulated directly from the pylon, via links which are comparable to those which have been described.

What is claimed is:

1. A device for attaching an engine to a pylon of an aircraft, said device including:

a first and s second assemblies forming lateral rods;

first connecting means adapted to connect the first assembly forming a lateral rod to a first female yoke secured to said pylon;

second connecting means adapted to connect the first assembly forming a lateral rod to a second female yoke secured to said engine;

third connecting means adapted to connect the second assembly forming a lateral rod to a third female yoke secured to said pylon; and fourth connecting means adapted to connect the second assembly forming a lateral rod to a fourth female yoke secured to said engine;

wherein each of said first, second, third, and fourth female yokes comprises a central web and two lateral webs, said lateral rods being received in said yokes on both sides of said central web, and wherein each of said connecting means includes a pin passing without clearance through said lateral rods and said central web and a passing with clearance through said lateral webs.

2. A device in accordance with claim 1, further including:

an assembly forming a bracket; and means of attachment through which the assembly forming a bracket is able to be attached to the pylon, wherein the assembly forming a bracket includes at least two brackets and each assembly forming a lateral rod includes two rods able to separately connect each of the brackets to the engine.

3. A device in accordance with claim 2, further including an assembly forming an intermediate part, inserted between the two brackets and the pylon, said assembly forming an intermediate part including two intermediate parts, and said means of attachment including first means of attachment for each bracket to one of the intermediate parts and second means of attachment for each intermediate part to the pylon.

4. A device in accordance with claim 2, wherein said first and third female yokes belong to each of said brackets, said first and third female yokes having adjacent webs forming said central web.

5. A device in accordance with claim 1, wherein spherical bearings are inserted between said pin on the one hand and the rods and the central web of said female yokes on the other hand.

* * * * *